United States Patent
Schmidt et al.

(10) Patent No.: US 11,285,433 B2
(45) Date of Patent: Mar. 29, 2022

(54) SCRUBBING COLUMN FOR CLEANING OF GAS STREAMS

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Hincal Leichner, Hochheim (DE); Christian Frey, Frankfurt am Main (DE); Sharon Corbet, Frankfurt (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 127 days.

(21) Appl. No.: 16/764,720

(22) PCT Filed: Nov. 5, 2018

(86) PCT No.: PCT/EP2018/025277
§ 371 (c)(1),
(2) Date: May 15, 2020

(87) PCT Pub. No.: WO2019/096441
PCT Pub. Date: May 23, 2019

(65) Prior Publication Data
US 2021/0170326 A1 Jun. 10, 2021

(30) Foreign Application Priority Data
Nov. 16, 2017 (EP) .................................. 17400063

(51) Int. Cl.
*B01D 47/14* (2006.01)
*B01D 53/14* (2006.01)
*B01D 53/18* (2006.01)

(52) U.S. Cl.
CPC ............. *B01D 53/18* (2013.01); *B01D 47/14* (2013.01); *B01D 53/1487* (2013.01);
(Continued)

(58) Field of Classification Search
CPC ...... B01D 2252/103; B01D 2252/2021; B01D 2252/20468; B01D 2256/10;
(Continued)

(56) References Cited

U.S. PATENT DOCUMENTS

| 1,715,252 A | 12/1921 | Sperr, Jr. |
| 4,002,705 A | 1/1977 | McKeown |

(Continued)

FOREIGN PATENT DOCUMENTS

| DE | 1 293 135 | 4/1969 |
| DE | 10 2009 036 973 | 2/2011 |

(Continued)

OTHER PUBLICATIONS

FR-2961115-A1 Machine Translation (Year: 2021).*
(Continued)

*Primary Examiner* — Cabrena Holecek
(74) *Attorney, Agent, or Firm* — Elwood L. Haynes

(57) ABSTRACT

The invention provides a scrubbing column for cleaning gas streams laden with absorbent residues, for example with methanol, and also with solid particles, for example with fuel dust. The gas scrubbing is effected by means of a random packing disposed in the lower region of the scrubbing column and the gas scrubbing of the gas stream laden solely with absorbent residues but not with solid particles by means of a structured packing disposed in the upper region of the scrubbing column. The use of the scrubbing column
(Continued)

according to the invention in the integrated plant system between a gasification plant and a plant for gas scrubbing which is operated by the Rectisol process, for example, offers particular advantages with regard to its industrial employability owing to the possible connections described, which bring synergies for efficient operation of the integrated plant system.

8 Claims, 1 Drawing Sheet

(52) U.S. Cl.
CPC .... B01D 53/1493 (2013.01); *B01D 2252/103* (2013.01); *B01D 2256/10* (2013.01); *B01D 2256/22* (2013.01); *B01D 2257/708* (2013.01); *B01D 2258/02* (2013.01)

(58) Field of Classification Search
CPC .......... B01D 2256/22; B01D 2257/708; B01D 2258/02; B01D 47/12; B01D 47/14; B01D 53/1475; B01D 53/1487; B01D 53/1493; B01D 53/18; C01B 2203/0415; C01B 2203/0475; C01B 2203/0485; C01B 3/52; Y02C 20/40; Y02P 20/151
See application file for complete search history.

(56) References Cited

U.S. PATENT DOCUMENTS

| 2012/0137583 | A1 | 6/2012 | Heinritz-Adrian et al. |
| 2013/0009101 | A1 | 1/2013 | Gazarian |

FOREIGN PATENT DOCUMENTS

| FR | 2 961 115 | 12/2011 | |
| FR | 2961115 A1 * | 12/2011 | .......... B01D 53/526 |
| GB | 924 190 | 4/1963 | |

OTHER PUBLICATIONS

International Search Report and Written Opinion for corresponding PCT/EP2018/025277, dated Feb. 19, 2019.
Ullmann's Encyclopedia of Industrial Chemistry, $6^{th}$ ed., 2000, vol. 15, 357-380 and 399-407.

* cited by examiner

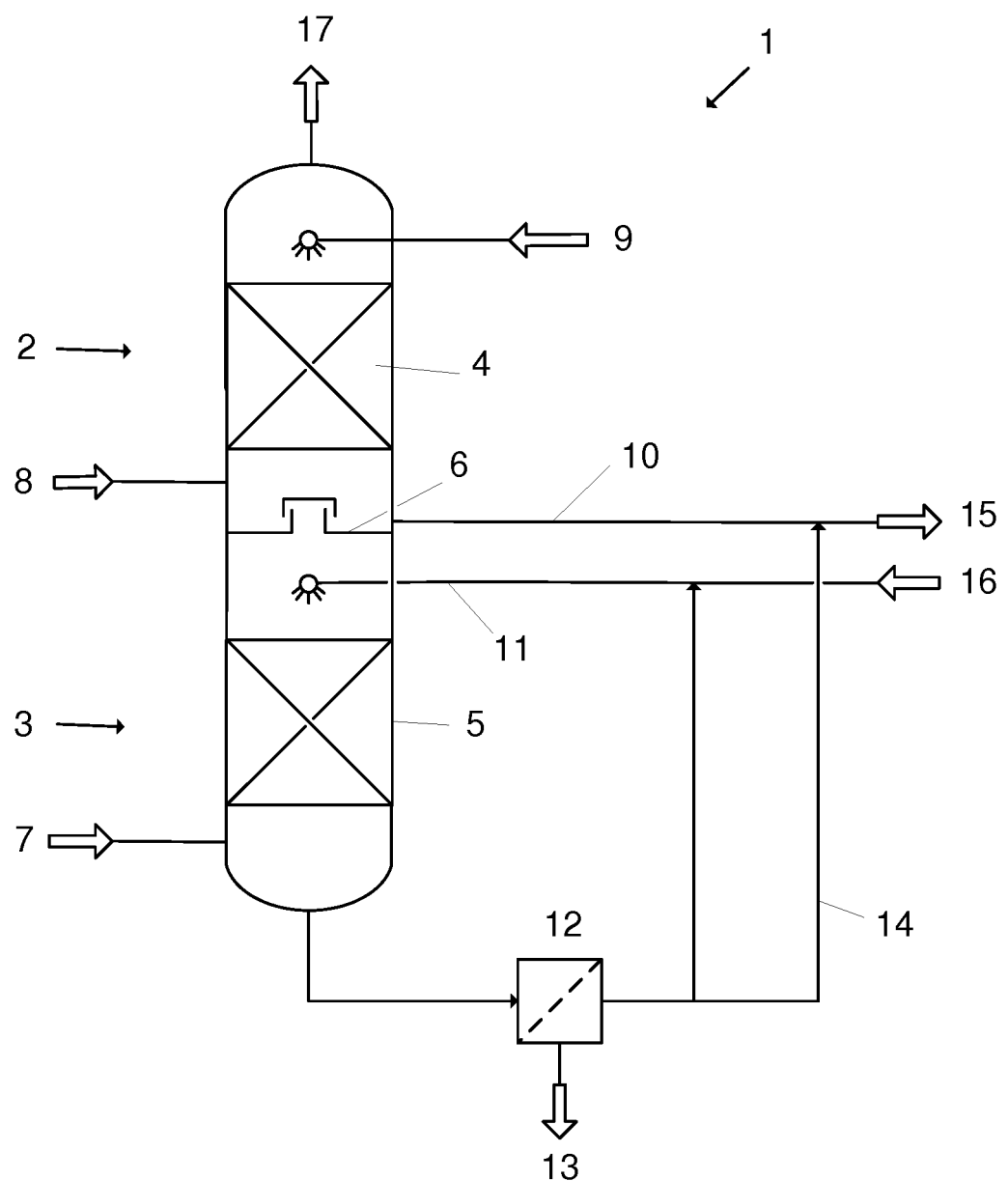

SCRUBBING COLUMN FOR CLEANING OF GAS STREAMS

CROSS REFERENCE TO RELATED APPLICATIONS

This application is a 371 of International Application PCT/EP2018/025277, filed Nov. 5, 2018, which claims priority to European Patent Application EP 17400063,8, filed Nov. 16, 2017, the entire contents of which are incorporated herein by reference.

BACKGROUND

Field of the Invention

The invention relates to a scrubbing column for cleaning of carbon dioxide-containing gas streams that are obtained, for example, as offgas streams from a solids gasification plant and a plant, connected downstream of the gasification plant, for separation of carbon dioxide and sulfur-containing accompanying gases by gas scrubbing.

The invention further relates to the use of the scrubbing column according to the invention for separating residues of methanol as the first absorbent used in the gas scrubbing and solid particles from a carbon dioxide-containing offgas stream.

The invention further relates to a process for separating residues of methanol as the absorbent used in the gas scrubbing and solid particles from a carbon dioxide-containing offgas stream.

State of the Art

Scrubbing columns and their use for gas cleaning or gas scrubbing are known to the person skilled in the art from the relevant prior art. Also known is the use of such scrubbing columns in integrated plant systems that comprise the production of crude synthesis gas by gasification of carbonaceous feedstocks, for example of coal, and the workup and purification of the crude synthesis gas in a gas cleaning plant connected downstream of the gasification plant. The present invention is concerned, in a specific aspect, with the treatment of offgases from entrained flow gasification plants for coal gasification and from gas cleaning plants that are connected downstream thereof and especially work by the Rectisol process.

The Rectisol process uses cryogenic methanol as absorbent, exploiting the property of methanol that its absorption capacity for the accompanying substances increases significantly with decreasing temperature, whereas it remains virtually constant for carbon monoxide (CO) and hydrogen ($H_2$). The sulfur-containing accompanying gases include carbon dioxide ($CO_2$) and sulfur-containing components, especially hydrogen sulfide $H_2S$, but also carbonyl sulfide COS, mercaptans RSH and further sulfur-containing components, e.g. sulfur-containing hydrocarbons.

In the case of the Rectisol process, a distinction is made between the standard process and the selective Rectisol process. In what is called the standard Rectisol process, the accompanying $COS/H_2S$ gases and the $CO_2$ are separated together from the crude synthesis gas in one absorption step.

This present invention relates more particularly to the selective Rectisol process. In this selective process, the accompanying sulfur-containing $COS/H_2S$ gases and the carbon dioxide are separated from the crude synthesis gas in two separate, successive absorption steps. The methanol used as scrubbing agent or absorbent is circulated, and is freed again of the accompanying gases in a regeneration stage within the process and hence reused as absorbent. The carbon dioxide is separated from the methanol in two successive steps, in the first step by abrupt expansion (called flashing) and in the second step by passing an auxiliary gas or regeneration gas through it (called stripping). Suitable stripping gases used may, for example, be water vapour, nitrogen or other gases or vapours that are inert with respect to the substances absorbed and the absorbent and are available inexpensively.

The carbon dioxide desorbed by flashing can, for example, be recycled into the gasification plant as auxiliary gas and used therein for pressurization of the lock hopper for the gasification feed, for example coal, since it has a suitable pressure level for the purpose. For the carbon dioxide stripped out of the laden methanol with nitrogen, by contrast, there is in most cases no economically viable possible use.

Both carbon dioxide-containing gas streams, both the gas stream previously used in the lock hopper and the gas stream obtained by stripping of the $CO_2$-laden methanol, are therefore ultimately released into the atmosphere. For this purpose, however, both streams have to be freed of their respective residual methanol content beforehand, with which they have left the regeneration stage, and also of solid particles, for example of fuel particles, that got into the gas in the course of use in the lock hopper. Scrubbing columns are frequently used for this purpose.

DE application document DE 10 2009 036 973 A1 describes the use of the carbon dioxide as auxiliary gas for pressurization of the lock hopper. In the drawing that belongs to this document, the lock hopper offgas leaves the lock hopper as stream 3e when it is decompressed. In this case, the solid particles are separated from the lock offgas by a filter before the residual methanol is scrubbed out. A disadvantage here is that a further process step, namely filtration, is required for separation of the solid particles.

Scrubbing columns for separation of methanol out of offgas streams from Rectisol plants that are to be released to the atmosphere are frequently operated with demineralized water as scrubbing liquid/absorbent, since this has good solubility for the methanol to be separated out. The mass transfer zone of such scrubbing columns is additionally frequently configured as a structured packing, since structured packings offer good mass transfer properties coupled with low pressure drop. However, the cleaning of a structured packing to remove particle deposits therein is very difficult, and so a filtration stage is required for removal of the solid particles, which is associated with additional apparatus complexity.

The problem addressed was therefore that of providing a scrubbing column that can be used for at least partial separation of solid particles and residues of a first absorbent from a carbon dioxide-containing offgas stream and, in a specific aspect, especially for reducing the residual methanol content even from particle-laden gas streams and from which dust deposits are removable with a lower level of complexity.

SUMMARY

The problem underlying the invention is solved essentially by a scrubbing column according to claim 1.

Scrubbing Column According to the Invention

Scrubbing column for at least partial removal of solid particles and residues of a first absorbent from a carbon dioxide-containing offgas stream, wherein the offgas stream comprises:
a first carbon dioxide-containing offgas substream obtained from a gasification plant for production of synthesis gas from carbonaceous feedstocks, wherein the first offgas substream is additionally laden with solid particles,
a second carbon dioxide-containing offgas substream obtained from a plant, connected downstream of the gasification plant, for separation of carbon dioxide and sulfur-containing accompanying gases from the synthesis gas by absorption with the first absorbent,
where the scrubbing column comprises the following constituents and assemblies:
a shell which—based on a state of the scrubbing column arranged as intended—extends along a longitudinal axis that runs parallel to the vertical and which encloses an interior, where the interior is divided into an upper region and a lower region, each of which comprises at least one mass transfer zone,
a structured packing, disposed in the upper region of the interior, for separating residues of the first absorbent from the second offgas substream by absorption with a second absorbent,
an inlet for the second absorbent disposed above the structured packing,
an inlet for the second offgas substream disposed below the structured packing,
a random packing disposed in the lower region of the interior and below the inlet for the second offgas substream,
an inlet for the first offgas substream laden with solid particles which is disposed below the random packing,
an outlet, disposed on the upper side of the shell, for the carbon dioxide-containing offgas stream that has been freed of residues of the first absorbent and of solid particles,
an outlet, disposed on the underside of the shell, for the second absorbent laden with residues of the first absorbent and with solid particles.

The solid particles originate, for example, from the carbonaceous feedstocks used, for example coal. A possible alternative is a proportion of solid particles in the gas which is formed from slag particles or particles that are produced in the event of mechanical stress on a gasification plant, for example by abrasion.

The sulfur-containing accompanying gases especially include hydrogen sulfide $H_2S$, but also carbonyl sulfide COS, mercaptans RSH and further sulfur-containing components, e.g. sulfur-containing hydrocarbons.

In the context of the present invention, an absorption is especially understood to mean gas scrubbing with suitable scrubbing agents or adsorbents. Standard processes for separating off carbon dioxide and/or sulfur-containing accompanying gases are, for example, the Rectisol process or the Purisol process. The first absorbent used here is cryogenic methanol in the Rectisol process or N-methylpyrrolidone (NMP) in aqueous solution in the Purisol process. Both substances have very good water solubility.

Fluid connection between two regions, constituents, components or assemblies is understood to mean any kind of connection that enables flow of a fluid from one to the other of the two regions, constituents, components or assemblies, regardless of any intervening regions, constituents, components or assemblies.

In the context of the present invention, a random packing is understood in the broader sense also to mean beds of grainy solids that are chemically inert with respect to the fluid media involved.

A solids removal apparatus is understood to mean an apparatus that works by a mechanical separation process for separation of solid particles from fluids. Preference is given here to using filtration in particular; examples of possible further separation methods are sedimentation, centrifugation or decantation. These separation methods can be used individually or in combination. The solid particles separated may be stored or intermediately stored in the solids removal apparatus and/or discharged therefrom via an outlet.

Said lock hoppers of the gasification plant are intermediate vessels or generally gas-tight intermediate regions that are delimited by walls and serve to introduce solid feedstocks and/or fuels into the gasification plant or to discharge solid by-products, for example slag or ash, from the gasification plant. The intermediate storage of the solids mentioned serves particularly for intermediate stockholding, such that a continuous or semi-continuous stream of solids into the/from the gasification plant can be assured. In addition, the lock hoppers serve to adjust the pressure and/or to establish a desired inert or reactive gas atmosphere, with use of the gases desired as purge gases, inertization gases and/or pressure adjustment gases. Particle-containing gas streams may additionally be obtained in gasification plants, for example in entrained flow gasification plants, as transport gases in the pneumatic conveying of solids, for example of the solid feedstocks.

An outlet disposed at the separation tray is understood to mean an outlet suitable for continuously discharging the liquid phase collected on the separation tray from the scrubbing column, such that flooding of the separation tray by backup of the liquid phase is prevented.

The inventive construction of the scrubbing column has the advantage that the particle loading of the offgas stream that comes from the solids gasification plant and in particular, but not exclusively, from the lock hopper therein is already separated by the random packing as it passes through and does not get into the structured packing beneath with the gas. For cleaning of particle deposits, a random packing can be removed from the column and reinserted in a very much simpler manner than a structured packing. The structured packing can be cleaned only with great difficulty and is effectively protected from soiling by particle deposits in the scrubbing column according to the invention.

The problem underlying the invention is also solved by the use of the scrubbing column according to claim 5 and by a process for at least partly separating solid particles and residues of a first absorbent from a carbon dioxide-containing offgas stream according to claim 11.

Use According to the Invention

Use of a scrubbing column according to claims 1 to 4 for separation of residues of methanol as first absorbent from a carbon dioxide-containing offgas stream from a gasification plant for production of synthesis gas from carbonaceous feedstocks and a plant, connected downstream of the gasification plant, for separation of carbon dioxide and sulfur-containing accompanying gases from the synthesis gas by absorption with methanol, where the second absorbent used is water.

Process According to the Invention

Process for at least partly separating solid particles and residues of a first absorbent from a carbon dioxide-containing offgas stream, wherein the offgas stream comprises:
   a first carbon dioxide-containing offgas substream obtained from a gasification plant for production of synthesis gas from carbonaceous feedstocks, where the first offgas substream is additionally laden with solid particles,
   a second carbon dioxide-containing offgas substream obtained from a plant, connected downstream of the gasification plant, for separation of carbon dioxide and sulfur-containing accompanying gases from the synthesis gas by absorption with the first absorbent,
comprising the following process steps:
   (a) providing the first carbon dioxide-containing offgas substream and the second carbon dioxide-containing offgas substream,
   (b) providing a scrubbing column according to Claims 1 to 4,
   (c) feeding the first carbon dioxide-containing offgas substream, laden with solid particles and residues of the first absorbent, to the scrubbing column,
   (d) feeding the second carbon dioxide-containing offgas substream, laden with residues of the first absorbent, to the scrubbing column,
   (e) feeding a stream of the second absorbent to the scrubbing column,
   (f) discharging a carbon dioxide-containing offgas stream that has been at least partly freed of solid particles and residues of the first absorbent from the scrubbing column,
   (g) discharging the stream of the second absorbent laden with the separated solid particles and residues of the first absorbent from the scrubbing column.

Further and preferred configurations of the invention can be found in the respective dependent claims.

Preferred Configurations of the Invention

In a preferred configuration of the scrubbing column according to the invention, it further comprises:
   a separation tray permeable to gases flowing upward, but impermeable to liquids flowing downward, disposed below the structured packing and below the inlet for the second offgas substream, but above the random packing,
   a second inlet for the second absorbent, disposed below the separation tray and above the random packing,
   an outlet for discharging the second absorbent laden with residues of the first absorbent from the separation tray.

In this way, the scrubbing liquids that are guided through the structured packing and through the random packing are kept separate. This keeps the volume of the liquid guided through the random packing and laden with particles small. In addition, it is possible to separately work up and regenerate the two scrubbing liquids, which increases the efficiency of the workup/regeneration.

A standard configuration of the separation tray is its execution as a chimney tray. Since the scrubbing agent utilized which is collected on the chimney tray is not laden with solid particles, there is advantageously no occurrence of particle deposits on the separation tray, especially the chimney tray.

In a further preferred configuration of the scrubbing column according to the invention, the second inlet for the second absorbent, disposed below the separation tray and above the random packing, and the outlet for the second absorbent laden with residues of the first absorbent and with solid particles, disposed on the underside of the shell, are in fluid connection with one another, where the scrubbing column further comprises:
   a solids separation apparatus for separation of solid particles from the second absorbent, in fluid connection with the outlet disposed on the underside of the shell,
   an outlet for discharge of the second absorbent that has been at least partly freed of solid particles from the solids separation apparatus, in fluid connection with the second inlet for the second absorbent, such that the second absorbent that has been at least partly freed of solid particles can be recycled to the scrubbing column.

In this way, the solid particles released in the lower mass transfer zone from the first absorbent into the second can be separated from the latter, and the second absorbent can then be reused in the scrubbing column, which reduces the consumption of the second absorbent.

In relation to the inventive use of the scrubbing column, in a preferred configuration, the gasification plant is an entrained flow gasification plant in which fine particulate coal is converted to synthesis gas by gasification. In this type of synthesis gas production, there is an occurrence of considerable amounts of offgases that are laden with solid particles and can therefore advantageously be purified in the scrubbing column according to the invention.

In addition, it is advantageous in relation to the inventive use of the scrubbing column when the first carbon dioxide-containing offgas substream laden with solid particles is lock hopper offgas from the gasification plant and the second carbon dioxide-containing offgas substream is offgas from the plant for separation of carbon dioxide and sulfur-containing accompanying gases which is obtained therein in the regeneration of the first absorbent used. This integrated plant system between gasification plant and cleaning of the crude synthesis gas by absorption, called gas scrubbing, frequently occurs, and so the problem addressed in these cases is to clean both the lock hopper offgas laden with solid particles from the gasification plant and an offgas stream obtained in the regeneration of the first absorbent used. Both offgas streams generally contain carbon dioxide.

Preferably, in relation to the inventive use of the scrubbing column, the second carbon dioxide-containing offgas substream is at least partly recycled to the gasification plant, where it is used in the lock hopper(s) as purge gas, transport gas, inertization gas and/or pressure adjustment gas to obtain lock hopper offgas. In this way, the second carbon dioxide-containing offgas substream coming from the gas scrubbing is utilized once again before it is cleaned, which saves fresh gases for charging of the lock hopper(s). This offgas substream is laden here with solid particles and can therefore advantageously be cleaned in the scrubbing column according to the invention.

In addition, in relation to the inventive use of the scrubbing column, it is advantageous when the water used as the second absorbent for contacting the structured packing is demineralized fresh water, and the water for contacting the random packing is demineralized water circulated through a solids removal apparatus, and when a water purge stream is discharged from the circuit and a fresh water stream is introduced as replacement stream. Water has good properties as solvent for numerous first absorbents and is environmentally neutral and available inexpensively. The described differentiated use as fresh water and the circulation water gives further cost advantages. First absorbents used may, for example, be methanol or N-methylpyrrolidone (NMP) in aqueous solution. Both substances have very good solubility in water.

In a further preferred configuration of the invention, the water used for contacting the structured packing and the water purge stream are freed of their methanol load together or separately by distillation, where the methanol separated off is reused at least partly as first absorbent in the plant for separation of carbon dioxide and sulfur-containing accompanying gases and the water separated off is reused at least partly for contacting the random packing. This achieves advantages in the workup of the water used as the second absorbent. On completion of workup, methanol, the first absorbent, can then be at least partly recycled into the plant for separation of carbon dioxide and sulfur-containing accompanying gases and water, the second absorbent, can at least partly be recycled into the scrubbing column according to the invention and reused therein.

In a particular configuration of the process according to the invention,
- the scrubbing column provided is configured according to claim 2 or 3, i.e. comprises a separation tray or specifically a chimney tray as separation tray,
- a substream of the second absorbent is introduced into the scrubbing column via the inlet disposed above the structured packing and discharged through the outlet disposed at the separation tray,
- a further substream of the second absorbent is introduced into the scrubbing column via the inlet disposed below the separation tray and above the random packing and discharged via the outlet disposed on the underside of the shell.

In this way, two circuits can be constructed for the second absorbent and the workup/regeneration of the second absorbent can be specifically matched to whether a separation of solid particles is required or not.

In a further particular configuration of the process according to the invention, the first absorbent is methanol and the second absorbent is water and the carbon dioxide-containing offgas stream is obtained in the operation of a gasification plant for production of synthesis gas from carbonaceous feedstocks and a plant, connected downstream of the gasification plant, for separation of carbon dioxide and sulfur-containing accompanying gases from the synthesis gas by absorption with methanol. Methanol is a proven absorbent for these separation tasks, for example in the Rectisol process. Water has good properties as a solvent for methanol and is environmentally neutral and available inexpensively. The described differentiated use as fresh water and circulation water gives further cost advantages.

In a further preferred configuration of the process according to the invention, the carbon dioxide-containing offgas stream comprises a first and a second offgas substream, where the first carbon dioxide-containing offgas substream laden with solid particles is lock hopper offgas from the gasification plant and the second carbon dioxide-containing offgas substream is offgas from the plant for separation of carbon dioxide and sulfur-containing accompanying gases which is obtained therein in the regeneration of the first absorbent used, where the second carbon dioxide-containing offgas substream is at least partly recycled to the gasification plant, where it is used in the lock hopper(s) as purge gas, transport gas, inertization gas and/or pressure adjustment gas to obtain lock hopper offgas. This integrated plant system between gasification plant and cleaning of the crude synthesis gas by absorption, called gas scrubbing, occurs frequently, and so, in these cases, the problem addressed is that of cleaning both the lock hopper offgas laden with solid particles from the gasification plant and an offgas stream obtained in the regeneration of the first absorbent used. Both offgas streams generally contain carbon dioxide. Preferably, therefore, the second carbon dioxide-containing offgas substream is at least partly recycled to the gasification plant, where it is used in the lock hopper(s) as purge gas, transport gas, inertization gas and/or pressure adjustment gas to obtain lock hopper offgas. In this way, the second carbon dioxide-containing offgas substream that originates from the gas scrubbing is utilized once again before it is cleaned, which saves fresh gases for charging of the lock hopper(s). This offgas substream is laden here with solid particles and can therefore advantageously be cleaned in the scrubbing column according to the invention.

BRIEF DESCRIPTION OF THE DRAWINGS

Further features, advantages and possible uses of the invention will also be apparent from the description of a working example and of the drawing which follows. All the features described and/or shown as images, on their own or in any combination, form the subject matter of the invention, irrespective of their composition in the claims or their dependency references.

The sole FIGURE shows:

FIG. 1 is a schematic diagram of a longitudinal section through a scrubbing column according to the invention in an illustrative execution.

DETAILED DESCRIPTION OF PREFERRED EMBODIMENTS

In FIG. 1, the scrubbing column 1 comprises an upper scrubbing zone (mass transfer zone) 2 and a lower scrubbing zone (mass transfer zone) 3. The upper scrubbing zone 2 has been provided with a structured packing 4, and the lower scrubbing zone 3 with a random packing 5. The scrubbing liquids used in each of the zones are kept separate by a chimney tray 6 installed between the zones.

Lock hopper offgas 7 that has been released on expansion from a lock hopper in a plant for coal gasification, not visualized in FIG. 1, which is operated, for example, by the entrained flow gasification process, is freed of the fuel dust or particles of the solid gasification feedstock that have been taken up in the lock hopper by absorption or gas scrubbing with scrubbing water 11 in the lower scrubbing zone 3. Beforehand, a carbon dioxide-containing gas stream was obtained from the regeneration of methanol as the (first) absorbent in the Rectisol plant connected downstream of the gasification plant, which is not visualized, and partly recycled to the lock hopper as auxiliary gas stream. Therefore, the lock hopper offgas 7 comprises not only solid particles but also a proportion of vaporous methanol which is likewise separated from the gas stream in the scrubbing column 1 by absorption or gas scrubbing with water. When the methanol as the (first) absorbent is regenerated by flashing in the Rectisol plant, the carbon dioxide-containing gas stream and consequently also the lock hopper offgas 7 may also comprise a proportion of the flash gas, for example nitrogen. The flash step can be effected, for example, in the reabsorber of the Rectisol plant.

The remaining proportion of the carbon dioxide-containing gas stream 8 from the regeneration of the methanol absorbent in the Rectisol plant that has not been recycled to the lock hoppers of the gasification plant is introduced into the upper scrubbing zone 2 of the scrubbing column 1, where it is scrubbed together with the lock hopper gas 7 ascending through the chimney tray 6, with separation of methanol and absorption by the water. The scrubbing liquid or (second) absorbent used in the upper scrubbing zone 2 is demineralized water 9 which, laden with methanol, is collected in the chimney tray 6 and discharged for further treatment as stream 10 via an outlet at the chimney tray. The further treatment comprises, for example, distillative separation into methanol and water, the former being at least partly recycled as first absorbent to the Rectisol plant and the latter as the second absorbent to the scrubbing column 1.

The scrubbing water 11 from the lower scrubbing zone 3 is circulated via a particle separator 12. The solid particles removed therein are discharged together with a water purge stream 13 for further treatment or landfill disposal. A portion 14 of the scrubbing water circulated is discharged from the circuit as water purge stream for workup. In this example, the water purge stream is added to the scrubbing water 10 from the upper scrubbing zone 2 and discharged as stream 15 to a workup which is not visualized here. In the form of stream 16, a fresh water stream is supplied to the scrubbing water 11 in the circuit.

The carbon dioxide-containing gas stream 17 that has been freed of methanol and solid particles is discharged into the atmosphere at the top of the scrubbing column 1.

INDUSTRIAL APPLICABILITY

The invention provides a scrubbing column for scrubbing of gas streams laden with absorbent residues, for example with methanol, and also with solid particles, for example with fuel dust. The use of the scrubbing column according to the invention in an integrated plant system between a gasification plant and a plant for gas scrubbing which is operated by the Rectisol process, for example, offers particular advantages with regard to its industrial applicability owing to the possible connections described, which bring synergies for efficient operation of the integrated plant system.

LIST OF REFERENCE NUMERALS

1 scrubbing column
2 upper scrubbing zone (mass transfer zone)
3 lower scrubbing zone (mass transfer zone)
4 structured packing
5 random packing
6 chimney tray
7 lock hopper offgas, methanol- and dust-laden
8 $CO_2/N_2$ offgas, coming from reabsorption column of a Rectisol plant
9 demineralized water
10 methanol-laden scrubbing water
11 scrubbing water
12 particle separator
13 water purge stream, laden with solid particles
14 methanol-laden scrubbing water
15 methanol-laden scrubbing water for processing
16 fresh water stream
17 cleaned $CO_2/N_2$ offgas

The invention claimed is:

1. A scrubbing column for at least partial removal of solid particles and residues of a first absorbent from a carbon dioxide-containing off-gas stream, wherein the off-gas stream comprises:
   a first carbon dioxide-containing off-gas sub-stream obtained from a gasification plant for production of synthesis gas from carbonaceous feedstocks, wherein the first off-gas sub-stream is additionally laden with solid particles,
   a second carbon dioxide-containing off-gas sub-stream obtained from a plant, connected downstream of the gasification plant, for separation of carbon dioxide and sulfur-containing accompanying gases from the synthesis gas by absorption with the first absorbent,
where the scrubbing column comprises the following constituents and assemblies:
   a shell which extends along a longitudinal axis that runs parallel to the vertical and which encloses an interior, where the interior is divided into an upper region and a lower region, each of which comprises at least one mass transfer zone,
   a structured packing, disposed in the upper region of the interior, for separating residues of the first absorbent from the second off-gas sub-stream by absorption with a second absorbent,
   an inlet for the second absorbent disposed above the structured packing,
   an inlet for the second off-gas sub-stream disposed below the structured packing,
   a random packing disposed in the lower region of the interior and below the inlet for the second off-gas sub-stream,
   an inlet for the first off-gas sub-stream laden with solid particles which is disposed below the random packing,
   an outlet, disposed on the upper side of the shell, for the carbon dioxide-containing off-gas stream that has been freed of residues of the first absorbent and of solid particles, and
   an outlet, disposed on the underside of the shell, for the second absorbent laden with residues of the first absorbent and with solid particles.

2. The scrubbing column according to claim 1, further comprising:
   a separation tray permeable to gases flowing upward, but impermeable to liquids flowing downward, disposed below the structured packing and below the inlet for the second off-gas sub-stream, but above the random packing,
   a second inlet for the second absorbent, disposed below the separation tray and above the random packing, and
   an outlet for discharging the second absorbent laden with residues of the first absorbent from the separation tray.

3. The scrubbing column according to claim 2, wherein the separation tray takes the form of a chimney tray.

4. The scrubbing column according to claim 2, wherein the second inlet for the second absorbent, disposed below the separation tray and above the random packing, and the outlet for the second absorbent laden with residues of the first absorbent and with solid particles, disposed on the underside of the shell, are in fluid connection with one another, where the scrubbing column further comprises:
   a solids separation apparatus for separation of solid particles from the second absorbent, in fluid connection with the outlet disposed on the underside of the shell, and an outlet for discharge of the second absorbent that has been at least partly freed of solid particles from the solids separation apparatus, in fluid connection with the second inlet for the second absorbent, such that the second absorbent that has been at least partly freed of solid particles can be recycled to the scrubbing column.

5. A process for at least partly separating solid particles and residues of a first absorbent from a carbon dioxide-containing off-gas stream, wherein the off-gas stream comprises:
- a first carbon dioxide-containing off-gas sub-stream obtained from a gasification plant for production of synthesis gas from carbonaceous feedstocks, where the first off-gas sub-stream is additionally laden with solid particles,
- a second carbon dioxide-containing off-gas sub-stream obtained from a plant, connected downstream of the gasification plant, for separation of carbon dioxide and sulfur-containing accompanying gases from the synthesis gas by absorption with the first absorbent, comprising the following process steps:
- (a) providing the first carbon dioxide-containing off-gas sub-stream and the second carbon dioxide-containing off-gas sub-stream,
- (b) providing a scrubbing column according to claim 1,
- (c) feeding the first carbon dioxide-containing off-gas sub-stream, laden with solid particles and residues of the first absorbent, to the scrubbing column,
- (d) feeding the second carbon dioxide-containing off-gas sub-stream, laden with residues of the first absorbent, to the scrubbing column,
- (e) feeding a stream of the second absorbent to the scrubbing column,
- (f) discharging a carbon dioxide-containing off-gas stream that has been at least partly freed of solid particles and residues of the first absorbent from the scrubbing column, and
- (g) discharging the stream of the second absorbent laden with the separated solid particles and residues of the first absorbent from the scrubbing column.

6. The process according to claim 5, wherein the sub-stream of the second absorbent discharged via the outlet disposed on the underside of the shell is introduced into a solids removal apparatus, and wherein a sub-stream of the second absorbent that has been depleted of solid particles is discharged from the solids removal apparatus and at least partly recycled into the scrubbing column via the inlet disposed below the separation tray and above the random packing.

7. The process according to claim 5, wherein the first absorbent is methanol and the second absorbent is water and the carbon dioxide-containing off-gas stream is obtained in the operation of a gasification plant for production of synthesis gas from carbonaceous feedstocks and a plant, connected downstream of the gasification plant, for separation of carbon dioxide and sulfur-containing accompanying gases from the synthesis gas by absorption with methanol.

8. The process according to claim 7, wherein the carbon dioxide-containing off-gas stream comprises a first and a second off-gas sub-stream, where the first carbon dioxide-containing off-gas sub-stream laden with solid particles is lock hopper off-gas from the gasification plant and the second carbon dioxide-containing off-gas sub-stream is off-gas from the plant for separation of carbon dioxide and sulfur-containing accompanying gases which is obtained therein in the regeneration of the first absorbent used, where the second carbon dioxide-containing off-gas sub-stream is at least partly recycled to the gasification plant, where it is used in the lock hopper(s) as purge gas, transport gas, inertization gas and/or pressure adjustment gas to obtain lock hopper off-gas.

* * * * *